Figure 2:
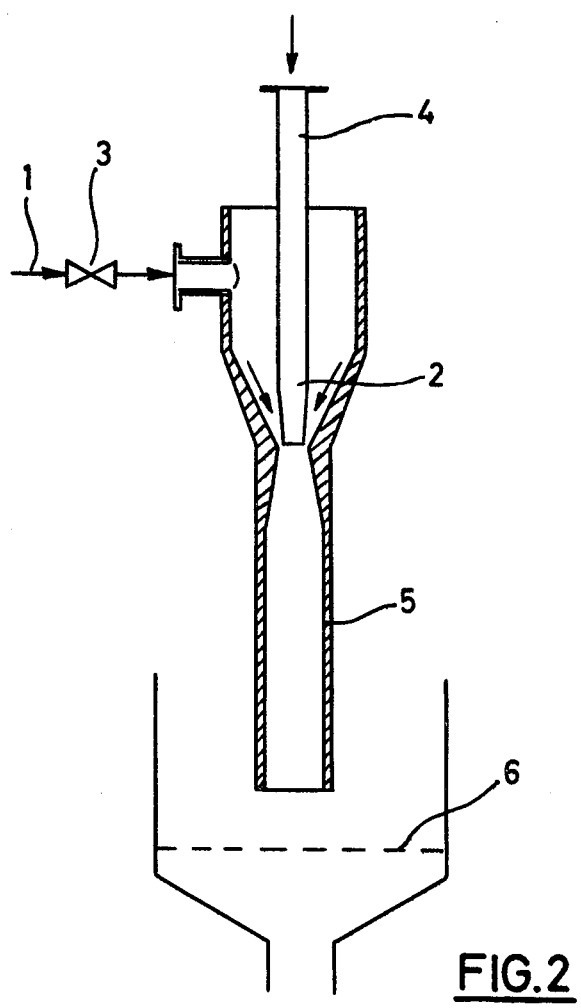

United States Patent [19]

Keppler et al.

[11] 4,104,341

[45] Aug. 1, 1978

[54] UTILIZATION OF CONSTITUENTS OF EFFLUENT FROM THE MANUFACTURE OF STYRENE BEAD POLYMERS IN THE MANUFACTURE OF FIBRIDS

[75] Inventors: Hans Georg Keppler, Weinheim; Bruno Sander; Rolf Moeller, both of Ludwigshafen; Eckhard Bonitz, Frankenthal; Werner Simmler, Ludwigshafen, all of Fed. Rep. of Germany

[73] Assignee: BASF Aktiengesellschaft, Ludwigshafen am Rhein, Fed. Rep. of Germany

[21] Appl. No.: 674,148

[22] Filed: Apr. 6, 1976

[30] Foreign Application Priority Data

Apr. 16, 1975 [DE] Fed. Rep. of Germany ....... 2516562

[51] Int. Cl.$^2$ ............................................. B22D 23/08
[52] U.S. Cl. ................... 264/9; 162/157 R; 210/45; 210/54; 260/2.3; 264/37; 264/140
[58] Field of Search .......................... 162/146, 157 R; 264/180, 183, 5, 13, 14, 37, 9, 140; 210/45, 42 R; 260/29.6 PT, 29.7 PT, 2.3

[56] References Cited

U.S. PATENT DOCUMENTS

| 2,999,788 | 9/1961 | Morgan ..... ................. 162/157 R |
|---|---|---|
| 3,123,518 | 3/1964 | Bundy ................................. 162/146 |
| 3,829,378 | 8/1974 | Keppler et al. ................... 210/42 R |

FOREIGN PATENT DOCUMENTS 2,057,734  5/1972  Fed. Rep. of Germany.

*Primary Examiner*—S. Leon Bashore
*Assistant Examiner*—Peter Chin
*Attorney, Agent, or Firm*—Keil, Thompson & Shurtleff

[57] ABSTRACT

A process for the manufacture of fibrids by dissolving, in a solvent, macromolecular waste materials from the bead polymerization of styrenes, and introducing the solution into a precipitation medium under the action of shearing forces to form fibrids.

1 Claim, 2 Drawing Figures

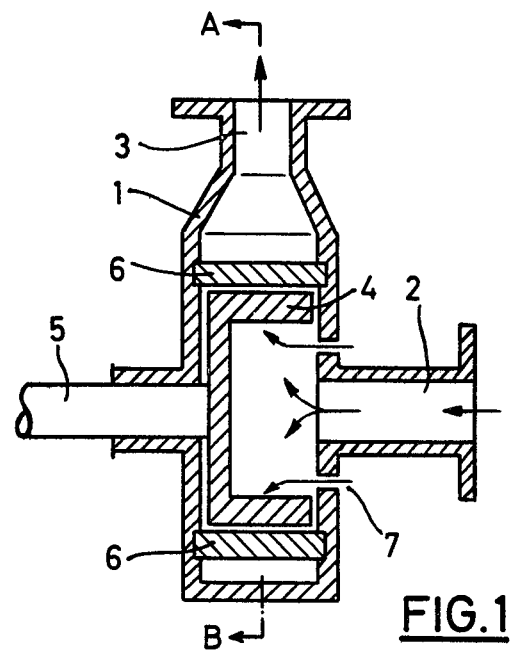
FIG.1
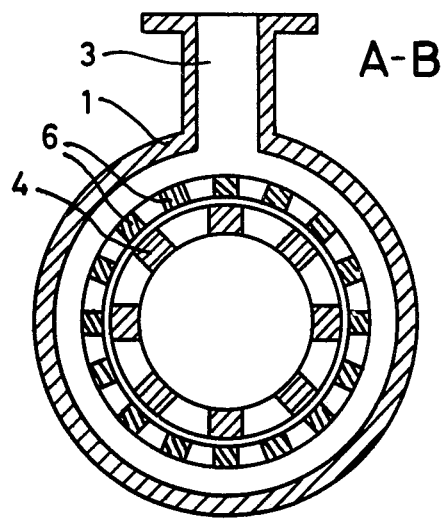
A-B

UTILIZATION OF CONSTITUENTS OF EFFLUENT FROM THE MANUFACTURE OF STYRENE BEAD POLYMERS IN THE MANUFACTURE OF FIBRIDS

The present invention relates to novel fibrids and to a process for the manufacture of such fibrids by dissolving macromolecular waste materials in a solvent and introducing the resulting solution into a fluid precipitation medium under the action of shearing forces.

It is true that it has hitherto been possible to separate macromolecular waste materials contained in the effluent obtained in the bead polymerization of styrenes from the aqueous phase and to dispose of these materials by burning or dumping them, but a profitable and technically reasonable utilization of these waste materials has not previously been disclosed.

The effluent from the bead polymerization of styrenes, which contains the macromolecular waste materials in a very finely dispersed form, has been clarified by using, e.g., water-swellable organic adsorbents such as bentonite. An alternative method is coprecipitation with iron hydroxide. However, these precipitates are heavily hydrated and therefore difficult to filter off.

More effective and more economical processes for precipitating and eliminating the macromolecular constituents of the effluent from the bead polymerization of styrenes are disclosed in German Laid-Open Application No. 2,057,734 and German Laid-Open Application No. 2,150,056. According to these, either copolymers of acrylic acid, or the alkali metal salts or ammonium salts of such copolymers, are used as precipitants, or the materials are flocculated by heating the effluent in the presence of persulfates.

It is an object of the present invention to convert the constituents isolated from the effluent from the bead polymerization of styrenes into industrially utilizable products and thereby at the same time to reduce pollution of the environment by making it unnecessary to burn or dump these materials.

We have found that this object is achieved by a process for the manufacture of fibrids by dissolving macromolecular waste materials in an organic solvent and introducing the resulting solution into a fluid precipitation medium under the action of shearing forces, in which the macromolecular waste materials used are the constituents, isolated by conventional methods of separation, of the aqueous phase from the bead polymerization of styrenes in the presence of protective colloids, which remains after separating off the bead polymer.

The preferred organic solvents are tetrahydrofuran or 1,4-dioxane and the preferred fluid precipitant is water.

It is a further object of the present invention to manufacture novel fibrids having a high degree of fibrillation and a high water absorbency.

We have found that this object is achieved by fibrids of the macromolecular constituents, isolated by conventional methods of separation, of the aqueous phase from the bead polymerization of styrenes in the presence of protective colloids, which remains after separating off the bead polymer, the fibrids having a specific surface area of from 10 to 30 $m^2/g$, a freeness of from 15 to 30°SR, a length of from 0.5 to 20 mm and a thickness of from 1 to 10 $\mu$.

For the purposes of the invention, fibrids are to be understood as fibrous particles of macromolecular materials. In size, shape and morphology, the fibrids resemble cellulose fibers or beaten wood pulp. The manufacture of fibrids is disclosed, e.g., in U.S. Pat. Nos. 2,999,788 and 2,988,782.

Dissolving the macromolecular waste material in an organic solvent means converting the solid and dry or moist waste material into a homogeneous mixture with the solvent. The mutual distribution of the components may be molecularly disperse or macro-disperse. To achieve this, the macromolecular waste material, which may contain from 0.1 to 60 percent by weight of water of moisture, is dissolved or very finely dispersed in the solvent, preferably whilst stirring; this process is advantageously carried out at room temperature. Particularly suitable organic solvents have proved to be tetrahydrofuran and 1,4-dioxane, the former being preferred.

The fibrids are produced by introducing the resulting solution or dispersion into a fluid precipitation medium, whilst shearing forces act on the latter and on the solution or dispersion being run in. Water has proved a particularly suitable precipitation medium. However, the process can also be carried out with other precipitation media, e.g. ethylene glycol. The only decisive factor is that the solvent should be soluble in, or miscible in all proportions with, the fluid precipitation medium, whereas the (initially) dissolved macromolecular material is insoluble in the said medium. Shearing forces can be applied to the precipitation medium and to the polymer solution or polymer dispersion by mechanical means, using rotary equipment. Commercial machinery used for mixing, dispersing and homogenizing for instance polymer dispersion is suitable for this purpose. If the process is carried out batchwise, high-speed mixers or Ultra-Turrax type apparatus which generates a field of shearing forces can be used. The action of the shearing forces on the fluid media generates a rotary motion, or turbulence.

In a preferred method, the fluid precipitation medium and the polymer solution or polymer dispersion are made to rotate by means of a rotor in a housing. To produce the fibrids, the solution of the macromolecular waste material is introduced through a tube into the fluid precipitation medium, the outlet orifice of the tube being at a point at which the fluid media are at maximum acceleration. The fibrid suspension obtained is continuously discharged from a discharge nozzle.

In another preferred embodiment, the solution or dispersion of the macromolecular waste material is forced out through one or more nozzles, and at the same time the fluid precipitation medium, at a flow rate of at least 5 m/sec, is thoroughly mixed with the solution or dispersion of the macromolecular material in a turbulence zone.

In a special embodiment, the thorough mixing of the fluid media is effected in an impulse exchange chamber upstream of, and concentric with, the two-fluid nozzle. The apparatus is described in German Laid-Open Application No. 2,208,921.

A further embodiment employs the injector principle. The apparatus is described in more detail in Example 4, with the aid of FIG. 2.

In all the variants of the process, stable discrete fibrids are obtained directly. They can be separated from the fluid precipitation medium, and from the greater part of the organic solvent, by filtering or centrifuging. The residual solvent is removed by washing with water on the filter or in the centrifuge. The organic solvents employed can be recovered by distillation, and recycled to the process.

Conventional separation processes means the clarifying of the turbid aqueous phase obtained in the bead polymerization of styrenes in the presence of protective colloids by adding flocculating agents and precipitants, e.g. iron hydroxide, or by treatment with adsorbents, e.g. bentonite, or by foam flotation or by mictro-filtration. The aqueous phase from the bead polymerization should if possible be clarified in such a way that the predominantly macromolecular constituents are precipitated almost completely and can be isolated by filtering or centrifuging in a form in which they contain as little water as possible.

In a particularly suitable separation process described in German Laid-Open Application No. 2,057,743 for purifying effluent from the bead polymerization of styrenes in the presence of vinylpyrrolidone polymers as the protective colloid, there are added, per 100 parts of effluent, from 0.05 to 5.0 parts of water-soluble or water-dispersible high molecular weight compounds containing at least 10 percent by weight of polymerized acrylic acid units, or their alkali metal salts or ammonium salts, and the pH is reduced below 3 by adding inorganic acids. The constituents of the aqueous phase which hereupon flocculate can be separated off by means of filters, perforated belt presses or decanters, to give a product having a solids content of about 50%. The flocculated waste material can be used either while moist or after it has been dried.

According to another separation process, disclosed in German Laid-Open Application No. 2,150,056, for purifying effluent from the bead polymerization of styrenes in the presence of vinylpyrrolidone polymers or vinyl alcohol polymers as protective colloids, the effluent constituents are flocculated by heating the effluent in the presence of from 0.02 to 5 percent by weight of sodium persulfate, potassium persulfate or ammonium persulfate. The constituents of the effluent isolated in this way are also suitable for carrying out the process according to the invention.

The aqueous phase which remains in the bead polymerization of styrenes in the presence of protective colloids after the bead polymer has been removed, namely the effluent, contains constituents of various compositions, depending on the nature of the bead polymerization. For the process according to the invention, effluent from any styrene bead polymerization process can be used. Styrene bead polymers in this context does not mean solely bead polymers of styrene. Rather, the term also encompasses bead polymers of styrene derivatives, e.g. α-methylstyrene and p-chlorostyrene, or copolymers of at least 50 percent by weight of styrene or styrene derivatives with other monomers. Suitable comonomers are acrylonitrile, esters of acrylic acid or methacrylic acid with alcohols of 1 to 8 carbon atoms, N-vinyl compounds, e.g. vinylcarbazole, or small amounts of compounds which contain two double bonds, e.g. butadiene, divinylbenzene or butanediol diacrylate.

The styrene polymer beads may contain blowing agents which have been added before, during or after the bead polymerization. Suitable blowing agents are hydrocarbons which are gaseous or liquid under normal conditions, do not dissolve the styrene polymer and have boiling points below the softening point of the polymer, e.g. pentane.

The styrene bead polymers are manufactured by conventional processes and are described, e.g., in Houben-Weyl, Methoden der organischen Chemie, 4th edition (1961), volume XIV/1, pages 839 et seq. (Georg Thieme Verlag, Stuttgart). This publication also discloses the use of polyvinyl alcohol as a protective colloid. Its manufacture by saponifying polyvinyl acetate is disclosed, e.g., in Ullmann, Enzyklopädie der technischen Chemie, volume 14, (1963), pages 236 et seq. Polyvinyl alcohols containing ester groups may also be used as the protective colloid. German Pat. Nos. 801,233 and 1,151,117 disclose the bead polymerization of styrene with homopolymers and copolymers of vinylpyrrolidone as the protective colloid.

After such a dispersion polymerization has been carried out, the reaction mixture is cooled, and the polymer beads obtained are then separated from the milky turbid aqueous phase by centrifuging or filtering. The macromolecular constituents which remain in the aqueous phase comprise from 95.0 to 99.9 percent by weight of the styrene polymers or copolymers in question and from 0.1 to 5 percent by weight of the protective colloid remaining in the aqueous phase after bead polymerization, i.e., in particular, polymers and copolymers of vinylpyrrolidone, polymers of vinyl alcohol, or polyvinyl alcohols containing ester groups. The content of organic carbon of the constituents of the aqueous phase is in general from 2,000 to 40,000 mg/l of effluent.

For the purposes of the present invention, the term macromolecular waste materials means the macromolecular constituents (identified above) of the effluent from the bead polymerization of styrene which have been separated off and isolated and which may in addition contain from 1 to 50 percent by weight, preferably from 3 to 20 percent by weight, based on the waste materials, of the precipitant or flocculating agent employed. These may have various chemical constitutions, depending on the separation process employed. In the particularly suitable separation process disclosed in German Laid-Open Application No. 2,057,743 the flocculating agents are high molecular weight compounds which contain at least 10 percent by weight of polymerized acrylic acid units, or of the alkali metal salts or ammonium salts of such compounds.

The fibrids obtained according to the invention have a specific surface area of from 10 to 30 $m^2/g$, a freeness of from 15 to 30°SR, a length of from 0.5 to 20 mm and a thickness of from 1 to 10 $\mu$. They contain from 80 to 90 percent by weight of water and may be employed, in this form, for wet applications. For special purposes, the fibrids can be dried at elevated temperatures of up to 60° C. A method of drying which employs heating and transport gases which flow at a high rate has proved particularly suitable. This method de-felts fibrids which have become felted.

After appropriate further dilution with water, the aqueous suspensions of the fibrids can be processed, without additional use of dispersing assistants, on a paper machine or wet-laid non-woven machine, to give papery sheet-like structures. The fibrids according to the invention can also be mixed with cellulose fibers in any desired ratio and be processed on a paper machine to give self-supporting coherent webs.

Method of Measurement

The degree of fibrillation of the fibrids obtained was ascertained by determining the freeness by the Schopper-Riegler method (Korn-Burgstaller, Handbuch der Werkstoffprufung, 2nd edition, 1953, volume 4, Papier- und Zellstoffprüfung, page 388 et seq., Springer-Verlag). For this determination, the fibrids are introduced into an aqueous suspension of constant stock consistency (2 g/l, 20° C). The amount of water which can be retained by the suspended fibrids under specific conditions is determined. The higher the fibrillation of the fibrids the greater is the amount of water absorbed (°Schopper-Riegler, °SR). The Schopper-Riegler values for an unbeaten sulfite cellulose are from 12 to 15°SR. By way of example, the Schopper-Riegler values for the fibrids according to the invention are from 15 to 30°SR.

The specific surface area of the fibrids was determined by the BET nitrogen adsorption method (S. Brunauer, T. H. Emmett and E. Teller, J. Amer. Chem. Soc., 60 (1938), 309).

In the Examples, parts and percentages are by weight.

MANUFACTURE OF BEAD POLYMERS OF STYRENE, WITH POLYVINYLPYRROLIDONE AS THE PROTECTIVE COLLOID

A mixture of 100 parts of water, 0.05 part of sodium pyrophosphate, 0.05 part of sodium acetate, 100 parts of styrene, 0.3 part of dibenzoyl peroxide and 0.25 part of t-butyl perbenzoate is polymerized in a pressure-resistant stirred kettle, with constant stirring. To initiate polymerization, the mixture is heated to 80° C; it is then left for 7 hours at 80° C after which it is heated to 90° C; after 5 hours at 90° C it is heated to 110° C and is left for a further 4 hours at this temperature, whilst still stirring constantly. During polymerization — after a total of 2 hours' polymerization time at 80° C - 2.2 parts of a 10 percent strength aqueous solution of polyvinylpyrrolidone (K value = 90, measured by the method of Fikentscher, Cellulosechemie 13, 60 (1932)) are added to the reaction mixture in the course of 5 minutes. After a total polymerization time of 6 hours at 80° C, 7 parts of n-pentane are introduced in the course of 15 minutes.

After completion of polymerization, the reaction mixture is cooled. The polymer beads obtained are separated from the aqueous phase (effluent) which still contains suspended matter.

PRECIPITATION AND ISOLATION OF THE CONSTITUENTS OF THE EFFLUENT FROM THE BEAD POLYMERIZATION OF STYRENE, ACCORDING TO GERMAN LAID-OPEN APPLICATION 2,057,643

10 parts of a 20% strength aqueous solution of sodium polyacrylate are added to 1,000 parts of the effluent from the bead polymerization of styrene. The pH of the mixture is then brought to 2 by adding dilute sulfuric acid. The suspended matter flocculates spontaneously. The mixture is slowly stirred for a further 5-10 minutes. The flocculated material is then separated from the clear aqueous phase by means of a clarifying decanter. The solids content of the material discharged from the decanter is about 50%.

This solid, which gives an acid reaction, was used whilst still moist as the starting material for Examples 1 to 7 which follow. It will hereinafter be referred to as "waste material".

EXAMPLE 1

2,200 parts of waste material having a moisture content of 50% were dissolved or very finely dispersed in 9,000 parts of tetrahydrofuran, with vigorous stirring.

The following apparatus is used to manufacture the fibrids (FIG. 1): a housing 1 having an inlet nozzle 2 and outlet nozzle 3 contains a rotor 4 which is driven by a shaft 5. This rotor 4 causes the fluid precipitation medium, which is present in the housing and is continuously fed in through the inlet nozzle 2, to rotate. The kinetic energy of the rotor is thereby transferred to the fluid precipitation medium. The fluid precipitation medium which has been accelerated is braked in an annular braking zone 6. This braking zone is formed by a ring-shaped stator which possesses sharp-edged orifices and baffles.

To produce the fibrids, the fluid mixture is introduced by means of a metering pump through a pipeline 7 having an internal diameter of 4 mm into the precipitation medium, i.e. water, in the immediate vicinity of the rotor 4. At the same time, about a 20-fold volume of water was fed into the machine through the inlet nozzle 2. The fibrid suspension discharged from the outlet nozzle 3 was conveyed to a collecting tank. The fibrids accumulated at the surface and were skinned off.

The removal of the water which still adhered to the material, and the subsequent removal of the residual solvent by washing with water, was effected in a helical conveyor continuous centrifuge. After this stage, 7,386 parts of fibrids containing 86% of water were obtained. This corresponds to a solids content of fibrids of 1,034 parts.

It was thus possible to convert the waste material to fibrids with a yield of 94% of theory.

The discrete fibrids obtained, which are very finely fibrillated, have a length of from 0.5 to 20 mm and a thickness of from 3 to 6 $\mu$. Measurements of the characteristic properties of the fibrids gave:

Specific surface area 13.6 m$^2$/g
Freeness 18°SR

From the fibrids, it was possible to produce webs having a homogeneous formation and good fiber bond on a sheet-forming apparatus. The webs were easily removable from the wire of the apparatus.

EXAMPLE 2

The procedure described in Example 1 was followed except that 1,100 parts of dried waste material were employed to manufacture fibrids. 7,040 parts of fibrids containing 85% of water were obtained. This corresponds to a solids content of fibrids of 1,056 parts.

It was thus possible to convert the dried waste material to fibrids with a yield of 96% of theory.

The dimensions of the fibrids obtained correspond to those of the fibrids obtained in Example 1. However, their structure is even finer. Measurements of the characteristic properties of the fibrids gave:

Specific surface area 22.3 m$^2$/g
Freeness 20.0°SR

A mixed paper having a homogenous formation and good fiber bond was obtainable from 70% of the fibrids obtained above and 30% of sulfite cellulose of freeness 35°SR.

EXAMPLE 3

(batchwise method)

110 parts of dried waste material were dissolved or dispersed in 900 parts of tetrahydrofuran, with vigorous stirring.

To manufacture the fibrids, an apparatus (2 kilowatt drive) which generates a field of shearing forces (Ultra-Turrax type) was used. The shearing element of this apparatus is approximately at the center of the 10,000 parts of water introduced into a vessel. The polymer solution was metered into the precipitation medium through a tube of internal diameter 8 mm which passes through the bottom of the vessel, so as to be delivered directly at the point of maximum suction of the shearing element.

The fibrids which accumulated at the surface of the precipitation medium were removed from the vessel and freed from adhering solvent by washing with water on a laboratory suction filter.

6,968 parts of fibrids containing 85% of water were obtained. This corresponds to a solids content of fibrids of 1,045 parts. The conversion of the dried waste material to fibrids was 95% of theory.

The fibrids obtained had a length of from 0.5 to 15 mm and a thickness of from 3 to 6 $\mu$. In addition, the fibrous product contained some fines.

Measurements of the characteristic properties of the fibrids gave:
Specific surface area 15.5 m$^2$/g
Freeness 22.0° SR

EXAMPLE 4

500 parts of dried waste material are dissolved or very finely dispersed in 9,500 parts of tetrahydrofuran in a stirred vessel. The injector nozzle shown in FIG. 2 is used to manufacture the fibrids. The solution of the waste material is fed through pipeline 1 to an injector nozzle 2 through which flows a jet of water 4, which is under a pressure of 6 bars. The water leaves the nozzle, which has a diameter of 3.7 mm, at a speed of 25 m/sec. The adjoining mixing tube 5, which is conical in its upper part, has an internal diameter of 12 mm. The solution of the waste material is metered in, through the valve 3, in such a way that 1 liter of solution is thoroughly mixed with 20 l of water, which acts as the precipitation medium. The fibrids produced are collected by means of a screen 6.

The fibrids are drained, and washed with water, on a suction filter.

2,628 parts of fibrids containing 82% of water were obtained. This corresponds to a dry weight of fibrids of 473 parts.

Using this method, the conversion of the dried waste material to fibrids gave a yield of 94.5% of theory.

The fibrids obtained have a very fine structure, with a length of from 0.5 to 15 mm and a thickness of from 3 to 6 $\mu$.

Measurements of the characteristic properties of the fibrids gave:
Specific surface area 22.6 m$^2$/g
Freeness 15° SR

EXAMPLE 5

200 parts of dried waste material were dissolved or very finely dispersed in 9,800 parts of tetrahydrofuran at room temperature, in a pressure vessel equipped with a stirrer. The solution was then placed under a pressure of 10 bars of nitrogen. Finally, the solution was flashed through an 80 cm long pipeline of internal diameter 2 mm into a vessel which contained 10,000 parts of water as the precipitation medium. The fibrid suspension obtained was worked up as described in Example 4.

The resulting fibrids have a very fine structure; their dimensions correspond to those of the fibrids obtained as described in Example 4. The freeness was found to be 26° SR.

EXAMPLE 6

The polymer solution was prepared as described in Example 5. It was let down through the inner tube of a two-fluid nozzle which consists of two concentric tubes, the inner tube having an internal diameter of 2 mm and the outer tube having an internal diameter of 6 mm. At the same time the precipitation medium, i.e. water under a pressure of 5 bars, issued through the annular space of the nozzle. The precipitation medium and the polymer solution were thoroughly mixed in a cylindrical tube (an impulse exchange chamber as described in German Laid-Open Application No. 2,208,921) immediately downstream of the two-fluid nozzle. The entire nozzle device was located in 5,000 parts of water which had been introduced into a vessel. The fibrid suspension obtained was worked up as described in Example 4.

The resulting fibrids have a very fine structure; their dimensions correspond to those of the fibrids produced as described in Example 4. The freeness was found to be 18° SR.

EXAMPLE 7

1,746 parts of waste material containing 37% of moisture were dissolved or very finely dispersed in 9,000 parts of 1,4-dioxane, with vigorous stirring.

The fibrids were produced and worked up as described in Example 1.

7,003 parts of fibrids containing 85% of water were obtained. This corresponds to a solids content of fibrids of 1,050 parts. It was thus possible to convert the waste material to fibrids with a yield of 95.5% of theory.

The fibrids obtained are very finely fibrillated and have a length of from 0.5 to 15 mm and a thickness of from 2 to 5 $\mu$. The freeness was found to be 28° SR.

PRECIPITATION AND ISOLATION OF THE CONSTITUENTS OF THE EFFLUENT FROM THE BEAD POLYMERIZATION OF STYRENE, ACCORDING TO GERMAN LAID-OPEN APPLICATION NO. 2,150,056

Effluent resulting from the manufacture of bead polymers of styrene with polyvinylpyrrolidone as the protective colloid (see above) is used.

0.3% of ammonium peroxydisulfate is added to the effluent in a stirred vessel. This mixture is heated at 130° C for 30 minutes. After it has cooled, the suspended matter which has flocculated is separated from the clear aqueous phase and used to carry out the Example which follows.

EXAMPLE 8

1,100 parts of the waste material obtained in accordance with the above Example were dried and very finely dispersed in 9,000 parts of tetrahydrofuran by vigorous stirring. The fibrids were produced and worked up as described in Example 1.

8,575 parts of fibrids containing 88% of water were obtained. This corresponds to a solids content of fibrids of 1,029 parts. It was thus possible to convert the waste material to fibrids with a yield of 93.5% of theory.

The fibrids obtained are very finely fillibrated and have a length of from 0.5 to 20 mm and a thickness of from 2 to 5 $\mu$. The freeness was found to be 16° SR.

It was possible to use the fibrids to produce a mixed paper consisting of 70% of the above fibrids and 30% of sulfite cellulose, of freeness 35° SR.

USE OF CONSTITUENTS OF AN EFFLUENT FROM THE MANUFACTURE OF BEAD POLYMERS OF STYRENE WITH POLYVINYL ALCOHOL AS THE PROTECTIVE COLLOID FOR THE MANUFACTURE OF FIBRIDS (a) Manufacture of Bead Polymers of Styrene With Polyvinyl Alcohol as the Protective Colloid The bead polymerization was carried out under the same conditions as those described for the case where polyvinylpyrrolidone was used as the protective colloid. In the present case, the protective colloid was 3 parts of a 10% strength aqueous solution of an extensively saponified polyvinyl alcohol, which has a viscosity of 4 cp as measured on a 2% strength aqueous solution at 20° C in a Höppler viscometer.

(b) Flocculation

The precipitation and isolation of the suspended matter from the effluent obtained in the preceding example were carried out in accordance with German Laid-Open Application No. 2,150,056, as has been described in more detail above. The isolated material was dried at 60° C.

EXAMPLE 9

1,100 parts of the waste material obtained in the manner described above were dissolved or dispersed in 9,000 parts of tetrahydrofuran, with stirring. The fibrids were produced and worked up as described in Example 1.

8,000 parts of fibrids containing 87% of water were obtained. This corresponds to a solids content of fibrids of 1,040 parts. It was thus possible to convert the waste material to fibrids with a yield of 94.5% of theory.

The fibrids obtained are very finely fillibrated and have a length of from 0.5 to 2.0 mm and a thickness of from 2 to 5 $\mu$.

Measurements of the characteristic properties of the fibrids gave:

Specific surface area 19.8 m$^2$/g
Freeness 18.0° SR

We claim:

1. A process for the manufacture of discrete fibrids from a macromolecular waste material contained in the aqueous phase effluent obtained form the bead polymerization of a styrene monomeric reactant after removal of the bead polymer, said polymerization having been carried out in the presence of a vinylpyrrolidone polymer or a vinyl alcohol polymer as a protective colloid also present in said effluent, which process comprises:

flocculating said macromolecular waste material in said aqueous phase effluent by carrying out one of the following steps,
(a) when said effluent contains said vinylpyrrolidone polymer, by adding per 100 parts of effluent about 0.05 to 5.0 parts of a water-soluble or water-dispersible high molecular weight compound containing at least 10 percent by weight of polymerized acrylic acid units, or the alkali metal or ammonium salts thereof, and reducing the pH below 3 by adding an inorganic acid, or
(b) when said effluent contains said vinylpyrrolidone polymer or said vinyl alcohol polymer, by heating the effluent in the presence of from about 0.02 to 5 percent by weight of sodium persulfate, potassium persulfate or ammonium persulfate;
separating the resulting flocculated macromolecular waste material from the effluent as a solid product;
dissolving or finely dispersing the waste material obtained as the solid product in an organic solvent selected from the group consisting of tetrahydrofuran and 1,4-dioxane; and
introducing the resulting solution or dispersion into water as a fluid precipitation medium to precipitate the waste material under shearing forces applied thereto sufficiently to produce fibrids having a specific surface area of from 10 to 30 m$^2$/g, a freeness of from 15 to 30° SR, a length of from 0.5 to 20 mm and a thickness of from 1 to 10 $\mu$.

* * * * *